US008095618B2

(12) United States Patent
Lewis et al.

(10) Patent No.: US 8,095,618 B2
(45) Date of Patent: Jan. 10, 2012

(54) IN-MEMORY CACHING OF SHARED CUSTOMIZABLE MULTI-TENANT DATA

(75) Inventors: Elliot Lewis, Seattle, WA (US); Jay Grewal, Sammamish, WA (US); Andrei Smertin, Bellevue, WA (US); Michael James Ott, Redmond, WA (US); Mahesh Vijayaraghavan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1078 days.

(21) Appl. No.: 11/731,564

(22) Filed: Mar. 30, 2007

(65) Prior Publication Data

US 2008/0244184 A1 Oct. 2, 2008

(51) Int. Cl.
*G06F 15/167* (2006.01)
(52) U.S. Cl. ....................................... 709/213
(58) Field of Classification Search .................... 709/213
See application file for complete search history.

(56) References Cited

U.S. PATENT DOCUMENTS

| 5,038,278 A | 8/1991 | Steely, Jr. et al. ............. 711/133 |
| 6,421,683 B1 | 7/2002 | Lamburt ....................... 707/104.1 |
| 6,732,237 B1* | 5/2004 | Jacobs et al. ................... 711/119 |
| 7,529,728 B2 | 5/2009 | Weissman et al. ................ 707/2 |
| 7,624,126 B2 | 11/2009 | Pizzo et al. ..................... 707/200 |
| 2005/0223022 A1 | 10/2005 | Weissman et al. ............. 707/102 |
| 2006/0235831 A1 | 10/2006 | Adinolfi et al. .................... 707/3 |
| 2007/0130130 A1 | 6/2007 | Chan et al. ......................... 707/3 |
| 2007/0130137 A1* | 6/2007 | Oliver et al. ....................... 707/5 |
| 2007/0156842 A1* | 7/2007 | Vermeulen et al. ............ 709/217 |
| 2007/0266113 A1* | 11/2007 | Koopmans et al. ............ 709/217 |
| 2008/0222191 A1 | 9/2008 | Yoshida et al. ................ 707/102 |

FOREIGN PATENT DOCUMENTS

| KR | 1019960002006 | 1/2006 |
| WO | WO2008121540 A1 | 10/2008 |

OTHER PUBLICATIONS

Fredrick Chong, Gianpaolo Carraro, and Roger Walker. Multi-Tenant Data Architecture. Microsoft Corporation. Published Date: Jun. 2006. http://msdn.microsoft.com/en-us/library/aa479086.aspx . 16 pages.
International Search Report for PCT/US2008/057173 dated Aug. 22, 2008 (10 pages).

* cited by examiner

*Primary Examiner* — John Follansbee
*Assistant Examiner* — Maceeh Anwari
(74) *Attorney, Agent, or Firm* — Merchant & Gould P.C.

(57) ABSTRACT

In a multi-tenant data sharing environment with shared, customizable data attributes are assigned to requested data and stored in a cache store along with the requested data. For non-customized data designated as system data, one copy is stored in the cache store for use by multiple tenants allowing optimization of memory and performance for each data request/retrieval operation. A "delete sentinel" attribute may be assigned to non-existing data in the cache store enabling notification of requesting tenant(s) without a need to access the tenant data store each time a request for the non-existing data is received.

17 Claims, 7 Drawing Sheets

METHODS

FIG. 1

EXAMPLE CRM ARCHITECTURE

FIG. 2

EXAMPLE SHARING SCENARIOS

FIG. 3

NETWORK ENVIRONMENT

IN-MEMORY CACHING OF SHARED CUSTOMIZABLE MULTI-TENANT DATA

BACKGROUND

Customer Relationship Management (CRM) solutions provide tools and capabilities needed to create and maintain a clear picture of customers, from first contact through purchase and post-sales. For complex organizations, a CRM system may provide features and capabilities to help improve the way sales and marketing organizations target new customers, manage marketing campaigns, and drive sales activities. CRM systems may include many components, hardware and software, utilized individually or in a shared manner by users internal or external to the organization.

Thus, a typical CRM system hosts multiple organizations ("tenants"). Each tenant may be enabled to customize their CRM system by adding/deleting/modifying entities, attributes, relationships, forms, views, code-level extensibility plug-ins, and the like. In order to separate customizations implemented by different tenants, the customizations may be partitioned into separate tables that exist either in one database or in multiple databases. Despite the data partitioning, it may be desirable to share as much non-customized—but customizable—information as possible at runtime, to minimize memory requirements and improve performance.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to caching shared, customizable data for optimization of memory and performance in a multi-tenant data sharing environment. Attributes indicating a customization status of tenant data are stored in a cache store enabling a system to provide data to tenants from individual tenant data stores while caching requested data and not having to access the individual data stores if the requested data is already cached. A single copy of the "system level" or non-customized data may be stored for multiple tenants saving memory and system resources in each retrieval operation.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, sharing non-customized—but customizable—data in memory that is stored in multiple tables and even multiple databases is enabled with the ability to track what data within a single table has been customized. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
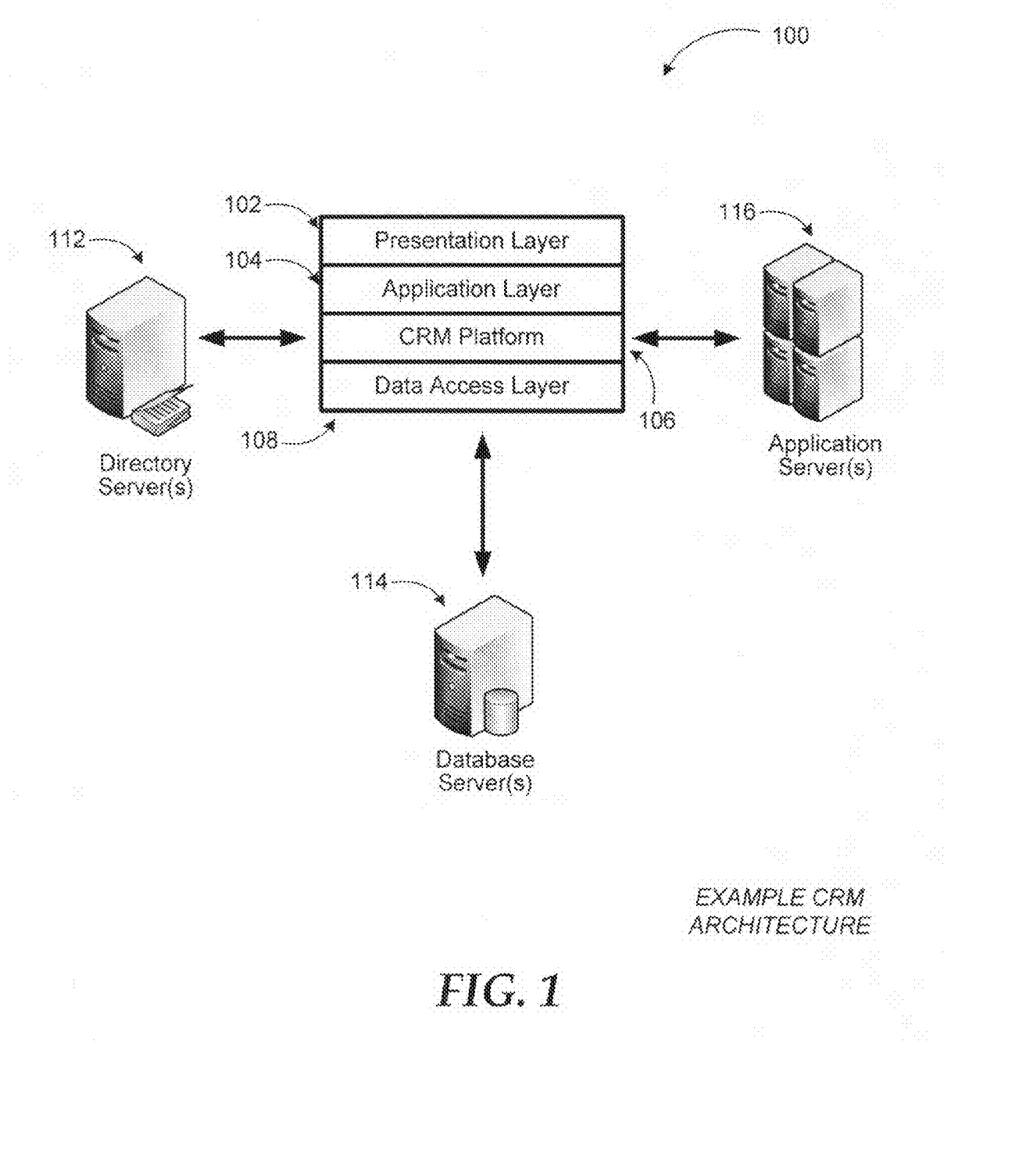
FIG. 1 illustrates an example CRM system architecture.

Referring to FIG. 1, an example architecture of CRM system 100 is illustrated. CRM system 100 may be implemented with four physical layers within a CRM architectural "stack." The layers include presentation layer 102 for presenting data and user interfaces to users (e.g. a web-based presentation) and application layer 104 for interacting with applications such as an electronic mail application, a scheduling application, a calendaring application, and the like. The layers further include CRM platform 106 that operates business or domain logic and data access layer 108 for managing interaction with database server(s) 114.

One or more of the layers may be combined or each may comprise separate sub-layers such as a data management layer and a data store layer that exist in separate process spaces for data access. Directory server(s) 112 may provide directory service for identifying security principals, roles, and groups within the product. Application server(s) 116 may provide auxiliary services such as those described above.

Figure 2:
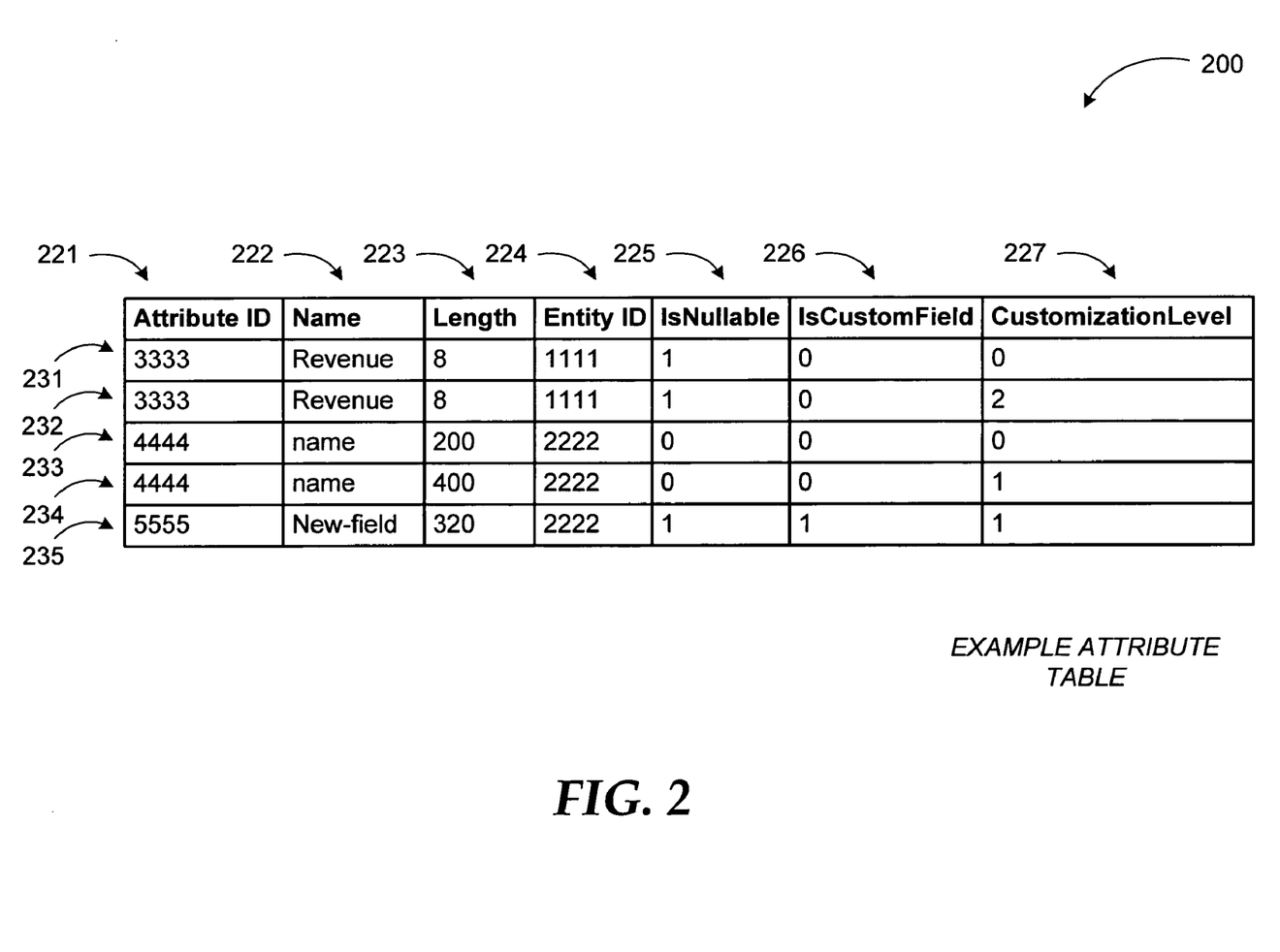
FIG. 2 illustrates an example attribute table for a shared customizable multi-tenant data caching model.

FIG. 2 illustrates example attribute table 200 for a shared customizable multi-tenant data caching model. Each type of customizable data in a CRM system (for example entities, attributes, or relationships) has its own properties and therefore is stored in its own table (for example, an entity table, an attribute table, or a relationship table). In a multi-tenant CRM system each tenant may have their own table for each type of customizable data. For example, each tenant may have an entity table, an attribute table, and a relationship table.

A CRM system, according to embodiments, may also provide an initial set of customizable data ("system" or "non-customized" data) which is a set that every tenant in a CRM system may start with upon installation and configuration. Since customization data is frequently accessed, it may be cached in-memory for each organization in an efficient way. Much of this data may remain the same across many tenants. Therefore, embodiments provide an approach to share the system data while maintaining a private copy of data that is customized by a particular tenant.

In a CRM system the in-memory caching may apply to:
metadata customizations (entities, attributes, relationships, etc.);
user interface customizations (forms, views, etc.);
Software Development Kit (SDK) customizations (SDK requests/responses, etc.); and
code-level customizations (extensibility plug-ins, etc.).

According to some embodiments, the shared and customizable multi-tenant data may be handled by tracking a data row's "customization level." This information determines if the row is a shared row, a new row from the customer, a shared row that has been customized, or a shared row that has been deleted. This information is then used to determine which information can be shared or not. Table 200 in FIG. 2 illustrates this "customization level" concept.

Table 200 includes attribute identifier 221 in first column, name 222 for the attribute in the second column, length 223 of the data in the third column. Entity identifier 224 and two attributes, nullable 225 and custom field 226 are in the following columns. The last column includes a listing of customization level attribute 227. A "CustomizationLevel" of 0 means "system" (system level data), 1 means "custom" (the data is new for the particular tenant or is a modification of system data), and 2 means "deleted."

In the example table 200, the attribute with name "Revenue" has been deleted (original indicated by row 231, updated version listed by row 232), the attribute with name "name" has been customized (original indicated by row 233, updated version listed by row 234), and the attribute with name "New_field" has been created by the tenant (as listed in row 235). Data with a "customization level" of 0 are data that has not been customized and is therefore "sharable" across tenants.

When the CRM system needs to retrieve a portion of the customizable data out of a cache, the cache first determines whether the portion of the data has already been retrieved from the database for the particular tenant. If the data has not been retrieved previously, the cache retrieves the portion of the data. The cache then looks at the "customization level" of the portion of the data retrieved. If the "customization level" is 0, the cache checks to determine whether the system data is already in the cache and, if not, adds it to the cache. The cache then inserts a "system sentinel" which indicates to the cache that if this data is requested again for this tenant, that it should instead retrieve the system data from the cache store. If the "customization level" of the piece of data is 1 the cache inserts the data into the cache store for the particular tenant. If the "customization level" of the portion of the data is 2, the data is not added to the cache. Instead a "delete sentinel" is added which indicates to the cache that if this piece of data is requested again for this tenant, the cache should return a notification that the data does not exist.

Figure 3:
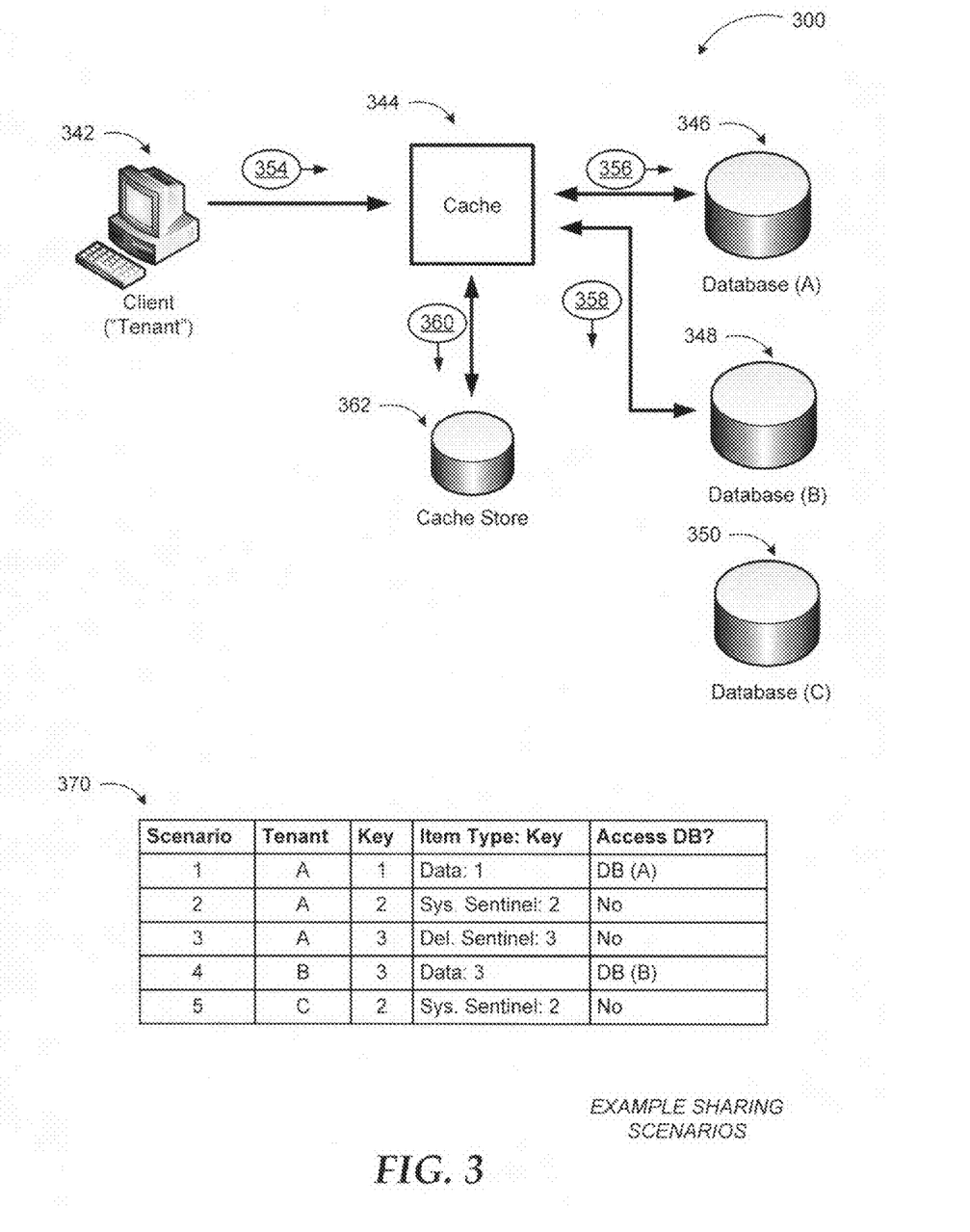
FIG. 3 illustrates example scenarios of tenant request processing in a system implementing shared customizable multi-tenant data caching.

FIG. 3 illustrates example scenarios of client request processing in a system implementing shared customizable multi-tenant data caching. The example scenarios of table 370 are shown in conjunction with example shared data caching system 300.

An operation according to embodiments begins with a request for data (354) being received in the CRM system from a client 342 associated with a tenant. The client may be any user (internal or external) of the CRM system accessing the system through a client device or application. As mentioned previously, each tenant may be associated with customizable shared data, a portion of which may be non-customized (system level) and another portion customized by that particular tenant. In addition, a portion of the data for a tenant may be deleted in the system. The CRM system may include individual databases for each tenant such as database (A) 346 for tenant A, database (B) 348 for tenant B, and database (C) 350 for tenant C. The CRM system may also include a single database with portions of the database assigned to individual tenants.

When the request is received at CRM system cache 344, cache 344 determines whether the requested data has previously been retrieved from the requesting tenant's database and, if so, what the customization level attribute is for the requested data. Cache 344 determines whether the data has already been retrieved by checking with cache store 362 (as indicated by reference numeral 360).

If the data has not been previously retrieved, cache 344 accesses the relevant database and retrieves the data or determines that the data no longer exists in the database (e.g. communications 356, 358). If the data was previously retrieved and is stored in the cache as a "system sentinel" attribute for this tenant then this tenant requires the system level data (non-customized), so the cache will retrieve the system level (non-customized) data from the cache store and provide it to the requesting tenant. If the data is retrieved for the first time and the customization level of the data indicates the data for this tenant are the system level (non-customized) data, cache 344 will add the system level data to cache store 362 provided the data is not already stored there. Additionally, a "system sentinel" attribute is inserted in the cache store 362 for this tenant. A "system sentinel" attribute enables the cache to provide the system level (non-customized) data to any client requesting that particular data without having to store multiple copies of it for each tenant. If the data is customized, the cache stores this custom data directly for that tenant, thereby enabling the cache to recognize customized data and provide it to the requesting tenant. Moreover, if the requested data no longer exists in the tenant database, a "delete sentinel" attribute may be inserted into the cache store to indicate to the requesting client on future requests that this data does not exist for that tenant without having to check the tenant database first.

Furthermore, the system may be enabled to recognize and assign attributes for particular types of customization (in case of multiple tenants using the same type of customization). Then, the cache may store in its local store one copy of each customized data and provide that to the requesting tenants based on the customization type attribute.

Now referring to the example scenarios of table 370, according to a first scenario in first row, tenant A requests data with key 1. Cache 344 access the cache store (362) and discovers there is no entry in the cache for this tenant for the item with key 1. Thus, cache 344 accesses (356) database (A) 346, retrieves the data, notices the customization level of the data is 1 (customized), and stores the data directly in cache store 362 for the requesting tenant, and then provides the retrieved data to the requesting tenant A.

According to the second scenario in the second row, tenant A requests another portion of data with key 2. The data has been previously retrieved and is found in cache store 362, however the data in the cache is a "system sentinel" for this tenant. Thus the cache retrieves the system (non-customized) data from the cache store and returns it to tenant A without having to retrieve it from database (A) 346.

According to the third scenario in the third row, tenant A requests another portion of data with key 3. The data has been deleted from database (A) 346 previously and an indication of that is stored in cache store 362 using the "delete sentinel" attribute. Thus, cache 344 provides a notification to tenant A that the requested data no longer exists without having to check with database (A) 346.

According to a fourth scenario in fourth row, tenant B requests data with key 3. This data has not been retrieved by tenant B, therefore cache 344 accesses (358) database (B) 348, retrieves and stores the data in cache store 362 because it sees that the customization level of the data in database (B) 348 is 1 and therefore tenant B has customized the data, and then provides it to the requesting tenant B.

According to the fifth scenario in the fifth row, tenant C requests data with key 2. Tenant C has requested this data before and the cache retrieved the data from database (C) 350, noticed the customization level was 0 (for system data), and inserted a system sentinel for this item. The non-customized data has been previously retrieved for tenant A and is found in cache store 362. Since the data is a system level data it is shared by all tenants, and since the cache store has a "system sentinel" for tenant C for data with key 2 the system data retrieved by tenant A can be provided to tenant C without having to retrieve it from database (C) 350.

The shared, customized data caching system and scenarios in FIG. 3 are exemplary for illustration purposes. A system for caching shared, customized data may be implemented using additional or fewer components using the principles described herein. Other scenarios of caching and providing customizable data to tenants are also possible in a system like the one described here.

Figure 4:
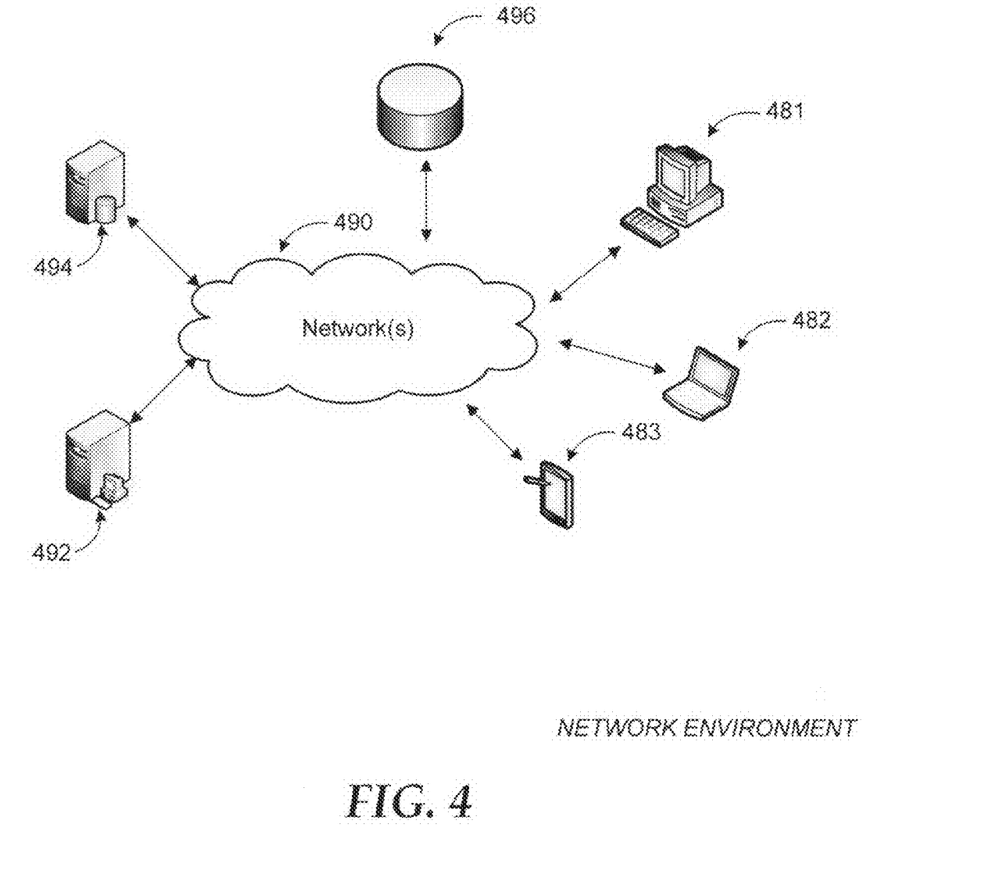
FIG. 4 is an example networked environment, where embodiments may be implemented.

FIG. 4 is an example networked environment, where embodiments may be implemented. CRM systems/applications and caching of shared, customizable data may be implemented locally on a single computing device or in a distributed manner over a number of physical and virtual clients and servers. They may also be implemented in un-clustered systems or clustered systems employing a number of nodes communicating over one or more networks (e.g. network(s) 490).

Such a system may comprise any topology of servers, clients, Internet service providers, and communication media. Also, the system may have a static or dynamic topology. The term "client" may refer to a client application or a client device. While a networked system implementing caching of shared, customizable data may involve many more components, relevant ones are discussed in conjunction with this figure.

Applications associated with a CRM system may be implemented in individual client devices 481-483 or executed in server 492 and accessed from anyone of the client devices (or applications). Similarly a shared, customizable data caching service associated with the CRM system may be executed locally in one of the client devices or, more typically, in one or more servers (e.g. server 492) and accessed by the client devices (or applications).

Data stores associated with caching shared, customizable data within a CRM system may be embodied in a single data store such as data store 496 or distributed over a number of data stores associated with individual client devices, servers, and the like. Dedicated database servers (e.g. database server 494) may be used to coordinate data retrieval and storage in one or more of such data stores.

Network(s) 490 may include a secure network such as an enterprise network, an unsecure network such as a wireless open network, or the Internet. Network(s) 490 provide communication between the nodes described herein. By way of example, and not limitation, network(s) 490 may include wired media such as a wired network or direct-wired connection, and wireless media such as acoustic, RF, infrared and other wireless media.

Many other configurations of computing devices, applications, data sources, data distribution systems may be employed to implement caching shared, customizable multi-tenant data. Furthermore, the networked environments discussed in FIG. 4 are for illustration purposes only. Embodiments are not limited to the example applications, modules, or processes.

Figure 5:
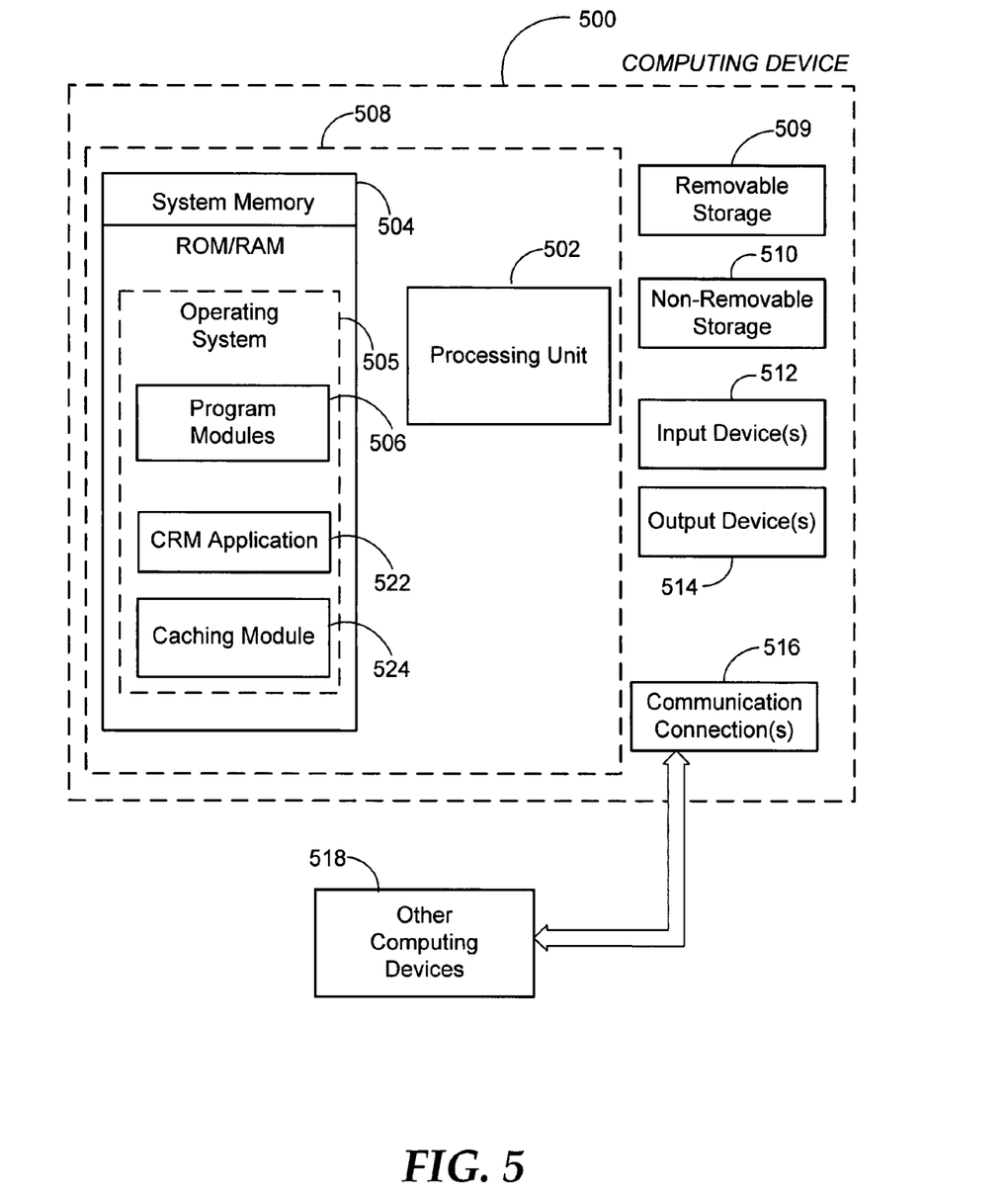
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment is illustrated, such as computing device 500. In a basic configuration, the computing device 500 may be a server or a client device providing shared, customizable data caching in conjunction with a CRM service and typically include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of a networked personal computer, such as the WINDOWS® operating systems from MICROSOFT CORPORATION of Redmond, Wash. The system memory 504 may also include one or more software applications such as program modules 506, CRM application 522, and caching module 524.

CRM application 522 may be a separate application or an integral module of a CRM service that provides customer relationship management services to client applications associated with computing device 500. Caching module 524 may provide services associated with determining a customization level attribute of requested data, caching retrieved data, and providing requested data or notification about the data to the CRM application, as described previously. This basic configuration is illustrated in FIG. 5 by those components within dashed line 508.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer storage media may include volatile and non-volatile, removable and non-removable media implemented in any method or technology for storage of information, such as computer readable instructions, data structures, program modules, or other data. System memory 504, removable storage 509 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of device 500. Computing device 500 may also have input device(s) 512 such as keyboard, mouse, pen, voice input device, touch input device, etc. Output device(s) 514 such as a display, speakers, printer, etc. may also be included. These devices are well known in the art and need not be discussed at length here.

The computing device 500 may also contain communication connections 516 that allow the device to communicate with other computing devices 518, such as over a wireless network in a distributed computing environment, for example, an intranet or the Internet. Other computing devices 518 may include server(s) that execute applications associated with a data access and directory service. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
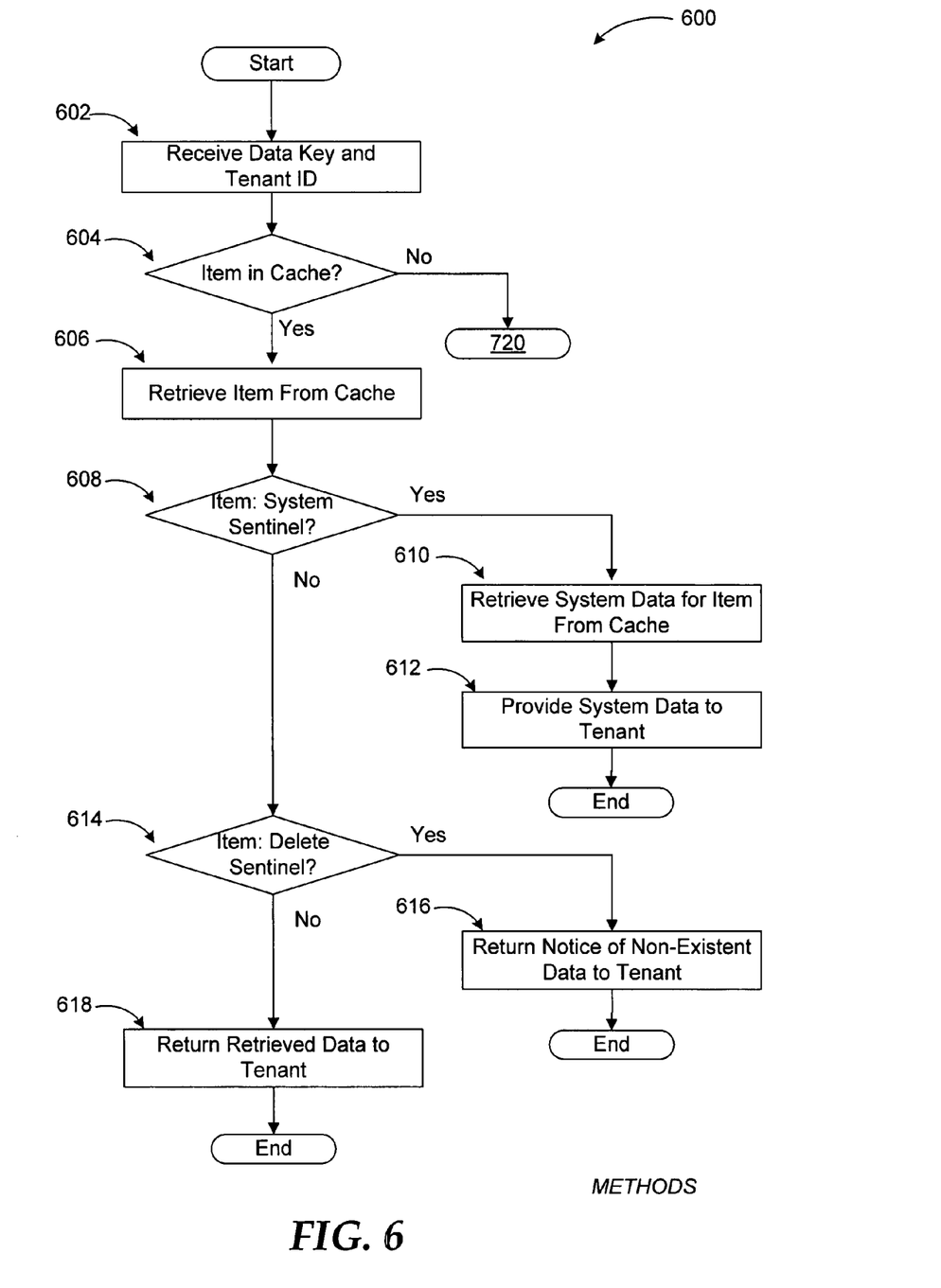
FIG. 6 illustrates a logic flow diagram for a process of shared customizable multi-tenant data caching.

FIG. 6 illustrates a logic flow diagram for a process of shared customizable multi-tenant data caching. Process 600 may be implemented as part of a CRM service.

Process 600 begins with operation 602, where a data key and a tenant ID are received by the cache of a CRM system indicating a request for data from the tenant. Processing advances from operation 602 to decision operation 604.

At decision operation 604, a determination is made whether an item associated with the requested data is in the cache. The item may include an attribute list for the requested data defining the data, or it may be a "system sentinel" or "delete sentinel" indicating that the item has been retrieved for this tenant but is either equivalent to the shared system version already in the cache or that the data have been deleted for this tenant. If the item does not exist in the cache, processing advances to operation 720 of process 700 in FIG. 7.

If the item is found in the cache at decision operation 604, processing advances to operation 606, where the item is retrieved from the cache store. Processing moves to decision operation 608 from operation 606.

At decision operation 608, a determination is made whether the cached item is a "system sentinel". If so, processing advances to operation 610, where the system data indicated by the item is retrieved from the cache store. Processing moves from operation 610 to operation 612, where the system data is provided to the requesting tenant. After operation 612, processing moves to a calling process for further actions.

If the determination at decision operation 608 is negative, processing advances to decision operation 614, where a determination is made whether the item is a "delete sentinel". If so, processing advances to operation 616, where a notification indicating non-existing data is provided to the requesting tenant. After operation 616, processing moves to a calling process for further actions.

If the determination at decision operation 614 is negative, it indicates that the data retrieved from the cache store represent customizations specific to the tenant with the given ID. Processing advances to operation 618, where the retrieved data is provided to the requesting tenant. After operation 618, processing moves to a calling process for further actions.

Figure 7:
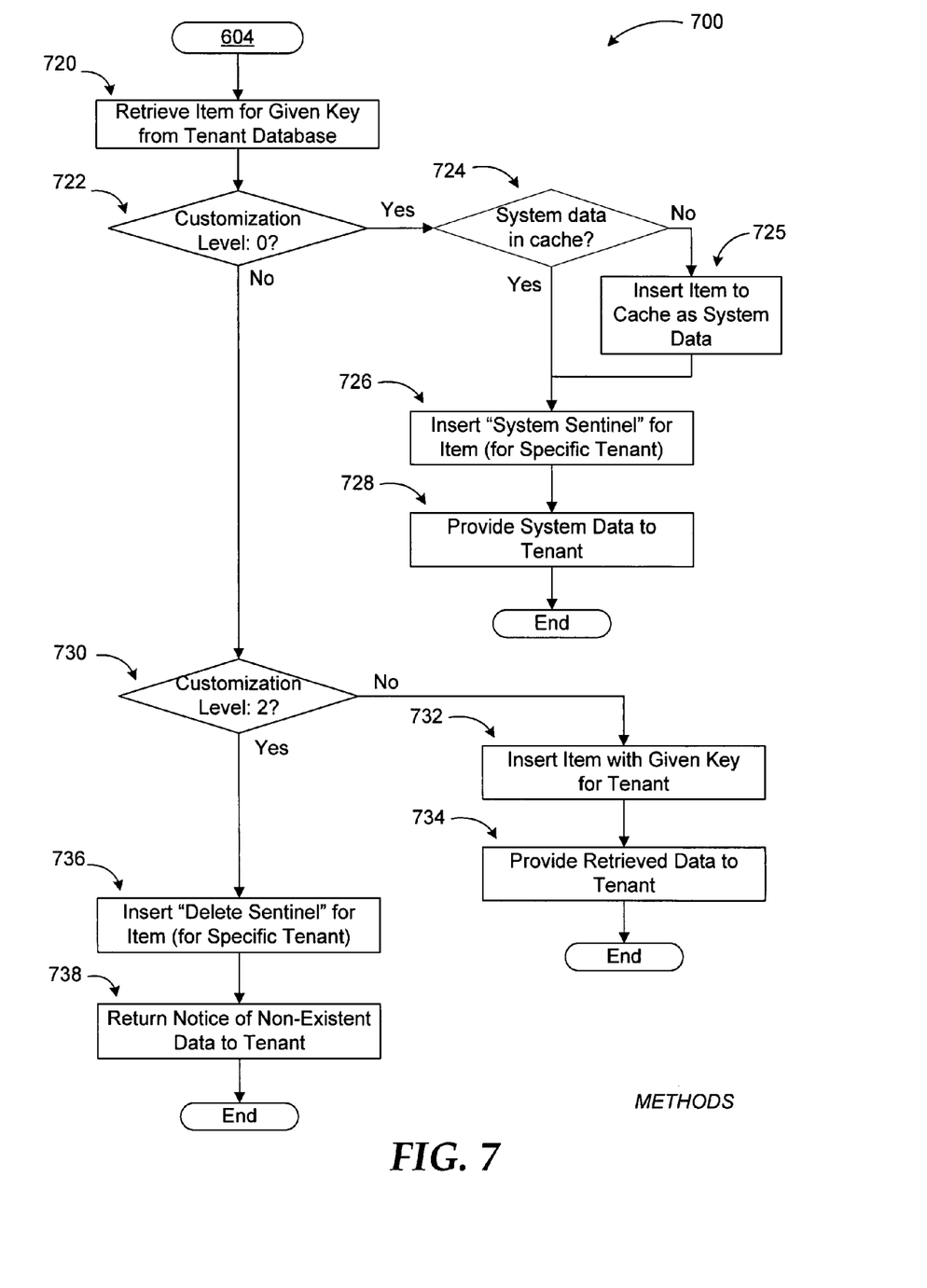
FIG. 7 illustrates a logic flow diagram for a portion of the process of shared customizable multi-tenant data caching of FIG. 6.

FIG. 7 illustrates a logic flow diagram for process 700, which is a portion of the process of shared customizable multi-tenant data caching of FIG. 6.

Process 700 begins with operation 720 following a negative determination at decision operation 604 of process 600. At operation 720 the requested data is retrieved from a database associated with the requesting tenant. Processing advances from operation 720 to decision operation 722.

At decision operation 722, a determination is made whether the customization level for the requested data is 0 indicating a system level, non-customized data. If the customization level is 0, processing advances to decision point 724.

At decision point 724, the cache determines whether the cache store already contains a copy of the system (non customized) data for the item with the given key. If the system data does not already exists in the cache store, processing advances to operation 725.

At operation 725 the data retrieved for this tenant is inserted into the cache store as the system (non-customized) data where it can be retrieved for this or other tenants requiring the system (non-customized) data in the future. Processing advances from operation 725 to 726.

If the determination at decision operation 724 is affirmative it means the system (non-customized) data for the given key already exists in the cache store. Processing advances to operation 726. At operation 726, a "system sentinel" is inserted in the cache store for the retrieved data and the requesting tenant. Processing moves to operation 728 from operation 726.

At operation 728, the system data is provided to the requesting tenant. After operation 728, processing moves to a calling process for further actions.

If the determination at decision operation 722 is negative, processing advances to decision operation 730, where a determination is made whether the customization level for the requested data is 2 indicating a non-existent data. If the customization level is 2, processing advances to operation 736.

At operation 736, a "delete sentinel" is inserted in the cache store for the retrieved data and the requesting tenant, indicating that the data has been deleted in the tenant database. Processing moves to operation 738 from operation 736.

At operation 738, a notification that the data no longer exists is provided to the requesting tenant. After operation 738, processing moves to a calling process for further actions.

If the determination at decision operation 730 is negative, processing advances to operation 732, where the data with the given key and tenant ID is inserted into the cache store because it is known to be data that is custom for the requesting tenant. Processing advances to operation 734 from operation 732.

At operation 734, the retrieved customized data is provided to the requesting tenant. After operation 734, processing moves to a calling process for further actions.

The operations included in processes 600 and 700 are for illustration purposes. Caching shared, customizable multi-tenant data may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for handling customizable data in a multi-tenant environment, the method comprising:
   receiving a request for data from a tenant;
   determining whether an entry associated with the requested data is stored in a cache store;
   when a determination is made that the entry associated with the requested data is stored in the cache store, determining whether the entry is a delete sentinel or a system sentinel, the delete sentinel indicating that the requested data associated with the entry does not exist in the cache store, the system sentinel indicating that the entry is associated with non-customized data that can be provided to any requesting tenant, the entry being associated with customized data for the tenant when the entry is neither the delete sentinel nor the system sentinel;
   when it is determined that the entry is the delete sentinel, providing a notice of non-existent data to the requesting tenant;
   when it is determined that the entry is the system sentinel, retrieving requested system data from the cache store and providing the data to the requesting tenant, a single copy of the retrieved requested system data being stored in the cache store for any requesting tenant;
   when it is determined that the entry is neither the delete sentinel nor the system sentinel, retrieving the requested customized data from the cache store;
   if no entry associated with the requested data is stored in the cache store:
      determining whether the data exists in a data store associated with the tenant;
      if the data does not exist in the data store associated with the tenant, storing a "delete sentinel" entry in the cache store and providing the notice of non-existent data to the requesting tenant;
      if the data exists in the data store associated with the tenant and is customized data for the tenant, storing the customized data in the cache store and providing the customized data to the requesting tenant; and
      if the data exists in the data store associated with the tenant and is system level data, storing a system sentinel and the system level data in the cache store and providing the customized data to any requesting tenant; and
      providing the requested customized data to the requesting tenant.

2. The method of claim 1, wherein the customized data is provided to the requesting tenant based on a data key and a tenant identifier associated with the request.

3. The method of claim 1, wherein data customized by a tenant is accessible by that tenant only.

4. The method of claim 1, further comprising:
   enabling a tenant to access data customized by another tenant.

5. The method of claim 1, wherein the customizable data includes at least one from a set of: metadata, a user interface form, a user interface view, an extensibility plug-in, and a communication parameter.

6. The method of claim 1, wherein a customization status of the data is stored as a customization level attribute.

7. A system for handling customizable data in a multi-tenant business application environment, comprising:
   a cache memory;
   a processor coupled to the memory, the memory including instructions that, when executed by the processor, cause the processor to implement program:
   a caching module configured to:
   determine whether an entry associated with the requested record is stored in the cache memory;
   provide a notice of non-existent record to the requesting tenant responsive to determining that the entry is stored and is a delete sentinel, the delete sentinel indicating that the requested record associated with the entry does not exist in the cache memory;
   retrieve the requested record from the cache memory and provide to the requesting tenant responsive to determining that the entry is stored and is a system sentinel, the system sentinel indicating that the entry is associated with non-customized data that can be provided to any requesting tenant, wherein a single copy of the record is stored in the cache memory for the any requesting tenant;
   if no entry associated with the requested data is stored in the cache store: determining whether the data exists in a data store associated with the tenant;
   if the data does not exist in the data store associated with the tenant, storing a delete sentinel entry in the cache store and providing the notice of non-existent data to the requesting tenant;
   if the data exists in the data store associated with the tenant and is customized data for the tenant, storing the customized data in the cache store and providing the customized data to the requesting tenant; and
   if the data exists in the data store associated with the tenant and is system level data, storing a system sentinel and the system level data in the cache store and providing the customized data to any requesting tenant; and
   provide the customized requested record to the requesting tenant responsive to determining that the entry is stored and is neither the delete sentinel nor the system sentinel.

8. The system of claim 7, wherein the caching module is further configured to: determine whether the record exists in a data store associated with the tenant responsive to determining that no entry associated with the record exists in the cache memory;
   store a delete sentinel entry in the cache memory and provide the notice of non-existent record to the requesting tenant responsive to determining one of: that the record does not exist and the record exists but is indicated as having been deleted by the tenant based on a value of a customization level of that record;

store the customized record in the cache memory and provide the customized record to the requesting tenant responsive to determining that the record exists in the data store associated with the tenant and is customized record for the tenant; and store a system sentinel and the system level record in the cache store and provide the customized record to any requesting tenant responsive to determining that the record exists in the data store associated with the tenant and is system level record.

9. The system of claim 8, wherein the caching module is further configured to:

store a customization level attribute indicating customization status of the retrieved record in the cache memory as part of the entry associated with the record.

10. The system of claim 8, wherein the customization level attribute is stored in an attribute table associated with the requested record.

11. The system of claim 7, wherein the processor is further configured to execute a business application module associated with a Customer Relationship Management (CRM) system for communicating with the requesting tenant.

12. The system of claim 7, wherein the data store associated with the requesting tenant is one of an individual database assigned to a single tenant and a portion of a database assigned to a plurality of tenants.

13. The system of claim 7, wherein the caching module is further configured to enable a tenant to permit sharing of customized record with other tenants based on a record identifier and a tenant identifier for each tenant.

14. The system of claim 7, wherein the caching module is further configured to update the entry associated with the requested data in the cache memory based on at least one of: expiration of a period, a tenant request, and notice of change from a data store associated with the tenant.

15. A computer-readable storage device with instructions stored thereon for handling customizable data in a multi-tenant business application environment, the instructions comprising:

determining whether an entry associated with requested data is stored in a cache store in response to receiving a request for data from a tenant;

if the entry is stored and is a delete sentinel, providing a notice of non-existent data to the requesting tenant, the delete sentinel indicating that the requested data associated with the entry does not exist in the cache memory;

if the entry is stored and is a system sentinel, making the requested data available to a plurality of requesting tenants without retrieving the data from a tenant data store for each request, the system sentinel indicating that the entry is associated with non-customized data that can be provided to any requesting tenant;

if no entry associated with the requested data is stored in the cache store and the requested data is available from a data store associated with the tenant:

retrieving the data from the data store associated with the tenant;

determining a customization level of the retrieved data;

if the data is customized, providing the customized data only to the requesting tenant; and if the data is non-customized, making the non-customized data available to any requesting tenant, wherein only one copy of the non-customized data is stored in the cache store; and if the entry is stored and is neither the delete sentinel nor the system sentinel, and the entry is the requested data that is customized for the tenant, making the customized data available only to the requesting tenant.

16. The computer-readable storage device of claim 15, wherein the instructions further comprise storing a system sentinel indicating a non-customized status of the retrieved data in the cache store.

17. The computer-readable storage device of claim 15, wherein the tenant includes one of an organization and a member of an organization participating in a CRM system.

* * * * *